July 31, 1934.   I. W. LITCHFIELD   1,968,155
CLUTCH AND OPERATING MECHANISM THEREFOR
Filed June 2, 1930    2 Sheets-Sheet 1
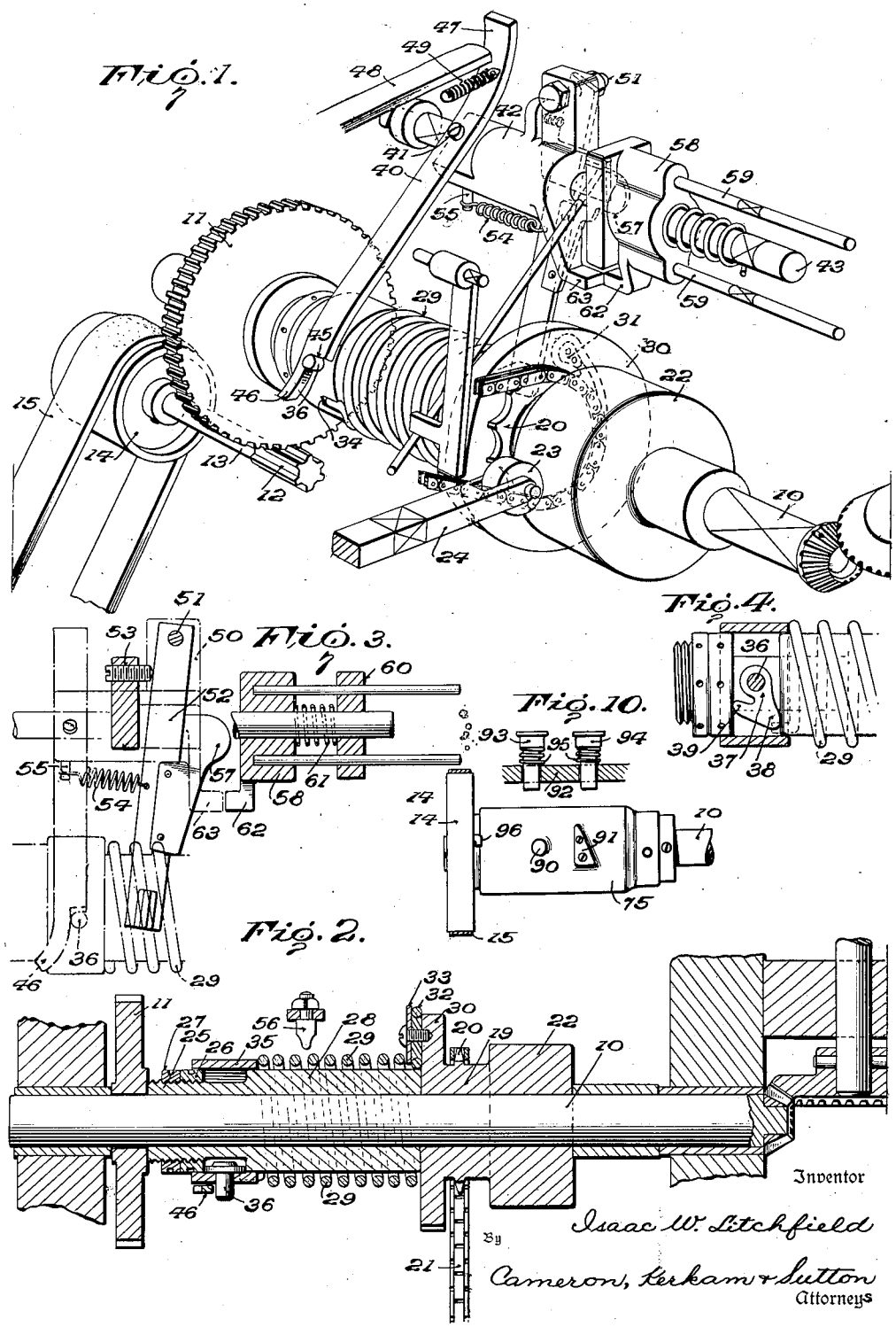
Inventor
Isaac W. Litchfield
By
Cameron, Kerkam & Sutton
Attorneys July 31, 1934. I. W. LITCHFIELD 1,968,155
CLUTCH AND OPERATING MECHANISM THEREFOR
Filed June 2, 1930 2 Sheets-Sheet 2
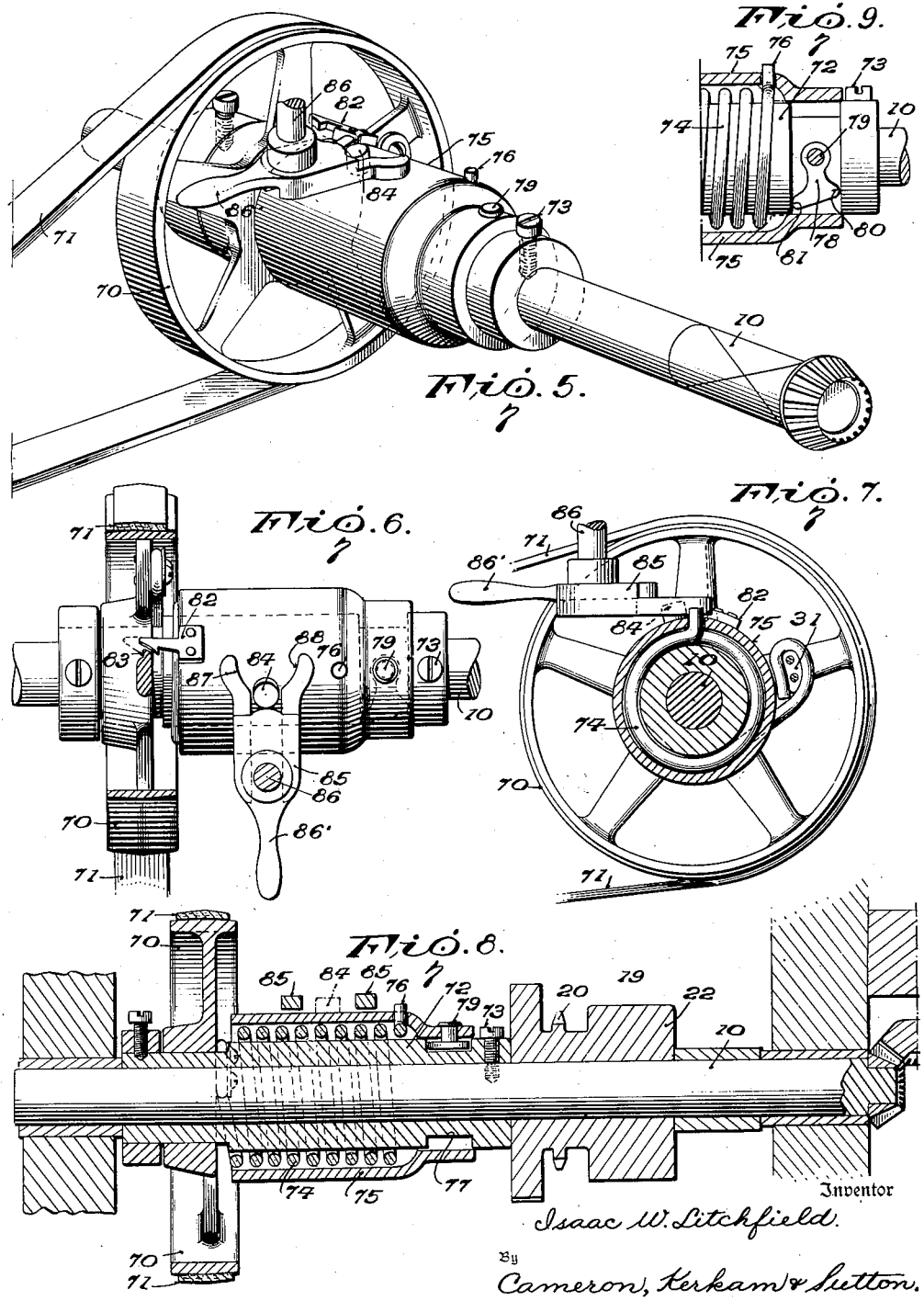

Patented July 31, 1934

1,968,155

UNITED STATES PATENT OFFICE 1,968,155

CLUTCH AND OPERATING MECHANISM THEREFOR

Isaac W. Litchfield, Boston, Mass.

Application June 2, 1930, Serial No. 458,995

35 Claims. (Cl. 192—139)

This invention relates to clutches and operating mechanism therefor, and more particularly to clutches of the type commonly referred to as wrap-down clutches and means for effecting the clutching and declutching action of the same.

It is an object of this invention to provide an improved wrap-down clutch employing a resilient helical clutch member which utilizes the resiliency of said clutch member in effecting or aiding the clutching action thereof.

Another object of this invention is to provide a wrap-down clutch having a resilient helical clutch member wherein the clutching action of said clutch member is initiated by the axial resiliency thereof.

Another object of this invention is to provide a wrap-down clutch having a resilient helical clutch member wherein the clutching action of said helical member is augmented by the axial resiliency of said clutch member.

Another object of this invention is to provide a wrap-down clutch with improved operating means for effecting the clutching and declutching thereof.

Another object of this invention is to provide a wrap-down clutch with improved manually operable means for effecting the clutching and declutching action thereof.

Another object of this invention is to provide a wrap-down clutch which includes automatic means in unitary relation therewith for operating the same for predetermined periods.

Another object of this invention is to provide improved means for securing a wrap-down clutch member to its driving or driven elements, or both, so that the pull on the clutch member will not tend to free said member from its attachment.

Another object of this invention is to provide an improved wrap-down clutch which is strong and durable, highly efficient, and relatively simple in construction. Other objects of the invention will appear as the description thereof proceeds.

The invention is capable of receiving a variety of mechanical expressions, some of which are shown on the accompanying drawings, one being an embodiment wherein the clutch mechanism is operated automatically, and the others of which are designed to be operated manually. It is to be expressly understood however that the drawings are for purposes of illustration only, and are not to be construed as definitions of the limits of the invention, but the operating mechanisms illustrated are to be taken as typical of a wide variety of constructions that could be embodied in a clutch in accordance with the broader aspects of the present invention. Reference is therefore to be had to the appended claims for a definition of the limits of said invention.

Referring in detail to the drawings, wherein the same reference characters are employed to designate corresponding parts in the several figures,—

Figs. 1 to 4 inclusive show an embodiment of the present invention employing automatic clutch control mechanism, these figures being copies of figures from my application Serial No. 442,953, filed April 9, 1930, for Bag closing machine. In these figures, Fig. 1 is a perspective elevation of a clutch embodying said invention and including automatic operating mechanism therefor;

Fig. 2 is an axial section through the clutch;

Fig. 3 is an elevational view, partly in section, of the automatic mechanism for operating the clutch; and Fig. 4 is a detailed view, partly in section, showing the actuator element of the clutch.

Figs. 5 to 10 inclusive illustrate embodiments of the present invention employing manual means for effecting the clutching and declutching actions. In these figures, Fig. 5 is a perspective view of the clutch;

Fig. 6 is a plan view, partly in section, of the clutch;

Fig. 7 is a radial section through the clutch;

Fig. 8 is an axial section through the clutch;

Fig. 9 is a detailed section, partly in section, showing the actuator element; and Fig. 10 shows another embodiment of manually operable means for effecting the clutching and declutching action.

In the form shown in Figs. 1 to 4 inclusive, 10 designates any suitable driving element, as a shaft which carries, suitably secured thereto, a driving member, as the gear 11, here shown in mesh with a pinion 12 on a stud shaft 13 which carries a pulley 14 driven through the belt 15 from any suitable source of power. Shaft 10 carries any suitable driven element, as a sleeve 19, freely rotatable on said shaft and shown as provided with a sprocket gear 20 for driving a chain 21 and a cam 22 for operating a cam follower 23 on the thrust rod 24.

The clutch mechanism embodying the present invention is interposed between the driving element 10 and the driven element 19, so that the sleeve 19 may be driven from the shaft 10 at desired or predetermined times. Adjacent gear 11 is an exteriorly threaded hub 25 which carries an interiorly threaded take-up collar 26 secured thereon by lock nut 27. Said hub 25 is the end portion of a drum 28 which is suitably secured to the shaft 10, and surrounding the drum 28 is a resilient wrap-down clutch member 29 in the form of a helical spring of any suitable cross section. One end of said spring 29 is fixedly secured to a collar 30 on the sleeve 19. In order that the tensioning of the spring may not tend to withdraw the end thereof from its attachment to the collar 30, the end of the spring, as shown in Fig. 1, is preferably carried outwardly around an oval block 31, and then inwardly between said oval block 31 and the drum 28 or a shoulder on the sleeve 19, so that the end of the spring is securely attached to said block 31. Block 31 may be secured to the collar 30 in any suitable way, as by a plurality of screws 32, and a retaining plate 33 may be attached to the block 31, or formed as an integral shoulder thereon, so as to prevent the spring from slipping off of said block in a direction parallel to the axis of the shaft. It will be perceived that the end of the spring is thus fixedly secured to the block 31 and the pull on the spring will not free the spring from said block.

The opposite end of the spring 29 is attached in any suitable way, as by engagement in a slot 34, to a collar 35 which surrounds the annular space between the end of the collar 26 and the shoulder 26' in the drum 28. Pivotally mounted on said collar 35, as by a pin 36, is a pawl-like actuator member 37 having the shape generally indicated in Fig. 4, said actuator member having a heel 38 and a toe 39 for a purpose hereinafter explained. Collar 35 may slide a limited distance axially with respect to the drum 28.

Means of any suitable character and construction are provided for effecting the wrapping and unwrapping of the helical member 29 with respect to the drum 28 and also to place said helical member under tension and release the same, to aid in the unwrapping and wrapping actions, as hereinafter explained more in detail. Figs. 1 to 4 illustrate an automatic mechanism in unitary relationship with the clutch for effecting an intermittent drive for a predetermined period of a driven member, but while this automatic mechanism forms a part of my present invention, it is to be understood that within the broader aspects of the invention, as relates to the clutch per se, this automatic mechanism is to be taken as typical of any one of a wide variety of devices either manual or automatic that may be employed in conjunction with the clutch of this invention.

As here shown, the means for effecting the clutching and declutching action includes a pin projecting exteriorly of the collar 35, which pin for convenience, although not necessarily, may be the same pin 36 as that upon which the actuator 37 is pivoted. Cooperating with said pin 36 is an arm 40 attached at 41 to a sleeve 42 which is rotatably mounted on a rod 43, said arm 40 having at its lower end a shoulder 45 and a curved cam extension 46 leading thereto. The opposite end 47 of said arm 40 lies in the path of a member 48 which may engage the extremity of the arm 40 and rotate it, together with sleeve 42, with respect to the rod 43, so as to free the shoulder 45 from the pin 36. A spring 49 tends to pull the arm 40 into the path of the pin 36.

Pivotally mounted on a lug 50 projecting from the sleeve 42, as by a pin 51, is a lever 52 that is normally pulled against an adjustable stop 53 by coil spring 54 attached at one end to said lever and at its opposite end to a pin 55 projecting from said sleeve. Lever 52 carries a wedge-shaped projection 56 suitably formed thereon or attached thereto and overlying the helical spring 29 so that when it is engaged therewith the rotating spring 29 will act as a feed screw for advancing the wedge-shaped projection 56 in the direction of the axis of said spring, moving said lever 52 around its axis 51 against the tension of spring 54. Suitably formed on or attached to the lever 51 is also a cam member 57.

Slidably mounted on the rod 43 is a cross head 58 which carries a pair of pins 59 that slide in apertures of a frame member 60 in which the rod 43 is mounted. Interposed between the cross head 58 and frame 60 is a coil spring 61 which normally urges the cross head toward the left as viewed in Figs. 1 and 3. Cross head 58 carries a radially and laterally extending lug 62 which is designed to cooperate with a radially and laterally extending lug 63 projecting from the sleeve 42.

When the parts are at rest with the clutch elements in declutched position, the parts occupy the relative position shown in Fig. 1. Shaft 10 is being driven through gear 11, pinion 12, and belt pulley 14, and drum 28 is rotating with said shaft, but sleeve 19 with the parts attached thereto and the spring 29 and collar 35 are stationary. Pin 36 is engaged with the shoulder 45 of the arm 40 whereby there is exerted on said sleeve a thrust which tends to hold the end of the spring 29 free of the drum 28. Said spring 29 is also held under compression by reason of the pin 36 being thrust toward the right as viewed in Fig. 1 by the action of the curved cam surface 46 on the arm 40. The projection 62 on the cross head 58 is in axial alignment with projection 63 on the sleeve 42, and the cross head 58 is held in the position illustrated in Fig. 3 with the spring 61 under compression.

Assume now that the operating member 48 is thrust toward the right as viewed in Fig. 1, an operation which can be readily effected in any suitable way either automatically or manually. Movement of member 48 against the end 47 of bar 40 will rotate the sleeve 42 slightly around its axis on the rod 43, freeing the pin 36 from the shoulder 45 and cam surface 46. Helical member 29 immediately expands in the direction of its axis forcing the actuator 37 against the collar 26, engaging the toe 39 of said actuator against said collar and tending to move said actuator in an anticlockwise direction as viewed in Fig. 4 so as to force the heel 38 thereof into engagement with the shoulder 26'. In other words, the actuator 37 is gripped between the collar 26 and shoulder 26', so that the collar 35 is clutched to the drum 28 and is caused to rotate in the direction to wrap spring 29 down onto drum 28, in a clockwise direction as viewed in Fig. 1, and hence drive the sleeve 19. The expansion of the spring in the direction of its axis when the spring is released also tends to aid the frictional grip of said spring 29 on the drum 28 by reason of the torsional resiliency of said spring, and advantage may also be taken of the fact, if desired, that the tendency of the spring to reduce its interior diameter as it expands in the direction of its axis, also tends to increase the frictional grip thereof. Therefore, a highly effective clutching action is obtained which does not impose any high tensile stress on the spring at any one cross section thereof, and this clutching action is effected with the aid of the axial resiliency of the spring which initiates and may tend to augment the friction developed between the spring and the drum 28 as said spring is wrapped down onto said drum.

When the sleeve 42 is rotated by the operating member 48 to free the pin 36, as heretofore described, the projection 63 is moved out of axial alignment with the projection 62 and the cross head 58 is moved toward the left as viewed in Fig. 3 by the coil spring 61, so that the projections 62 and 63 are in circumferential alignment. As cross head 58 cannot rotate by reason of its two pins 59 engaging the frame 60, the sleeve 42 is held in its rotated position with the arm 40 out of the path of the pin 36, and in this position the wedge projection 56 is held in engagement with the helical track formed between the coils of this spring 29. As said spring rotates with the shaft 10, the lever 52 is moved around its pivot 51 by the feeding action of the helical spring on the wedge projection 56 until such time as the cam surface 57 engages the cross head 58 and moves it to the right as viewed in Fig. 3, against the tension of spring 61, until the projections 62 and 63 are out of circumferential alignment. Thereupon the spring 49 restores the sleeve 42 to its initial position and moves the bar 40 so that its shoulder 45 is in the path of the pin 36 as the latter rotates toward the position shown in Fig. 1. Simultaneously the wedge projection 56 is removed from the coil spring 29 and lever 52 is restored to initial position by spring 54 and spring 61 moves cross head 58 to the left as viewed in Fig. 3 until lug 62 is reengaged axially with lug 63.

When pin 36 engages the cam extremity 46 of bar 40, pin 36 and its attached collar 35 are moved toward the right as viewed in Figs. 1 and 2, thereby compressing spring 29, and when the pin 36 engages the shoulder 45 the collar 35 is stopped in its rotation and the actuator 37 is disengaged from the collar 26 and shoulder 26', and the spring 29 is unwrapped with respect to the drum 28. Hence the parts are all restored to initial position with the sleeve 19 stationary.

In the embodiment of Figs. 5 to 9 inclusive, a clutch of the type heretofore described is embodied in conjunction with manual operating mechanism, the helical spring here being part of the driving element instead of the driven element as in Figs. 1 to 4. As here shown, the driving element takes the form of a pulley 70 driven by a belt 71 from any suitable source of power, said pulley being freely rotatable on or with respect to a drum 72 which is pinned, keyed or otherwise suitably attached, as by set screws 73, to the driven element or shaft 10 which as in the embodiment of Figs. 1 to 4, may carry a sleeve 19 with its sprocket wheel 20 and cam 22 suitably attached thereto.

Surrounding the drum 72 is a helical spring 74 constituting a wrap-down clutch member, said spring having one end rigidly attached to the pulley, as shown in Fig. 7 wherein is also illustrated the block 31 described in conjunction with the embodiment of Figs. 1 to 4, and the opposite end attached in any suitable way to a generally cylindrical shell 75, the end of the spring being shown as passed through an aperture in the shell as shown at 76. In this embodiment the helical spring is shown as wrapped in an anticlockwise direction as viewed from right to left in Fig. 8. Drum 72 is provided with a groove 77, and shell 75 carries an actuator 78 pivotally mounted on a pin 79 for operation in said groove, said actuator having a heel 80 and toe 81 as in the case of actuator 37.

Shell 75 carries a detent member 82 suitably attached to or formed thereon and adapted to cooperate with a notched surface 83 formed on one of the spokes of the pulley 70. When the shell 75 is moved to the left as viewed in Figs. 5 and 6, detent 82 may engage with the notched surface 83 and lock the shell 75 in its leftward position as indicated in dotted lines in Fig. 6. Shell 75 also carries an outwardly extending lug or projection 84 which is comparable in function with the outwardly extending end of the pin 36 in the embodiment of Figs. 1 to 4, but here said projection does not form a part of the pivot of the actuator.

Overlying the shell 75 and in the path of the projection 84 is a bifurcated clutch operator 85 pivotally mounted on a rod or shaft 86 which may project or depend from any suitable part of the stationary structure associated with the clutch mechanism. Clutch operator 85 has a hand grasp 86' for moving the same, and at its opposite bifurcated end said operator is provided with a pair of cam surfaces 87 and 88.

Assuming that the detent 82 has been locked to the notched surfaces 83 of the pulley 70, as shown in dotted lines in Fig. 6, shell 75 is in its leftward position and is rotating with the pulley 70, the spring 74 also rotating therewith. In this position of the parts the spring 74 is held under compression and is free as respects the drum 72, so that the driven shaft 10 is stationary. If the shaft 10 is to be driven, the clutch operator 85 is moved in a clockwise direction around its pivot 86 so as to bring the cam surface 87 into the path of the projection 84. When projection 84 engages cam surface 87, the shell 75 is retarded with respect to the pulley 70 so that the pulley spoke having the notched surface 83 rotates forwardly with respect to the detent 82, releasing said detent and permitting the coil spring 74 to expand toward the right as viewed in Figs. 6 and 8. Actuator 78 is thereby engaged with the surface at the right-hand side of the groove 77 as viewed in Fig. 9, and the engagement of the heel 80 of said actuator with the side of the groove 77 will force the toe 81 of said actuator into engagement with the opposite side of said groove, whereby said actuator grips the sides of said groove. As the spring is rotating and the drum 72 is stationary the spring will be wrapped down onto the drum 72 whereby clutch engagement between the spring 74 and the drum 72 is effected. Hence an efficient clutching action is obtained as described in detail in conjunction with the embodiment of Figs. 1 to 4.

When declutching is desired, the operator 85 is moved in an anticlockwise direction so as to engage the projection 84 with the cam surface 88. This tends to retard the shell 75 with respect to the pulley 70 and at the same time the shell 75 is cammed to the left as viewed in Figs. 6 to 8, releasing the actuator 78 and reengaging the detent 82 with the notched surface 83, so that the members are locked in initial declutched position.

In the embodiment of Fig. 10 the shell 75 rotates in the opposite direction from that of Figs. 5 to 9, and carries a pin 90 and a wedge shaped cam 91. Depressibly mounted in the frame 92 are a pair of pins 93 and 94 normally held out of the path of the pin 90 and cam 91 by springs 95. Detent mechanism is indicated at 96. Engagement of the depressed end of pin 93 with pin 90 will unlatch the shell and permit the shell to be moved toward the right by the resilient helical clutch member, as heretofore described, while engagement of the depressed end of pin 94 with cam 91 will cam the shell to the left and reengage the latch as hereinbefore described.

It will thus be perceived that clutch mechanism has been provided which employs a wrap-down resilient helical member the axial resiliency of which is utilized to initiate the wrap-down action. Moreover, the expansion of the resilient member may aid and augment the wrap-down action because the spring when released tends to grip the drum by reason of its resiliency as well as its tendency to decrease its internal diameter.

While particular means for operating clutch mechanism in accordance with the present invention has been disclosed for both automatic and manual operation of the clutch and possessing advantages in facility of operation or in operating the clutch for predetermined intervals of time, it is to be expressly understood that within the broader aspects of this invention any suitable form of manual or automatic operating mechanism may be employed for effecting the operation of the wrap-down member as a result of or with the aid of the resiliency of the spring. Thus upon expansion it may engage one of its ends with a suitable serrated or dentated surface, or any other suitable means can be employed in conjunction with the spring so that the expansion of the spring is utilized to initiate or aid the wrap-down function. By changes which will be readily understood by those skilled in the art, embodiments of the present invention can also utilize contraction of the spring as well as expansion of the spring to effect the foregoing function. It will also be readily appreciated that the clutches disclosed are reversible in action, i. e. the driven element may become the driving element and vice versa if the directions of relative rotation are suitable.

While the embodiments of the invention illustrated on the drawings have been described with considerable particularity, it is to be expressly understood that the invention is capable of receiving a variety of other mechanical expressions, some of which will readily suggest themselves to those skilled in the art, and changes may be made in the details of construction, arrangement and proportion of parts, and certain features used without other features, without departing from the spirit of this invention. Reference is therefore to be had to the claims hereto appended for a definition of the limits of the invention.

What is claimed is:

1. In a clutch, in combination with driving and driven elements, a resilient helical member interposed between said driving and driven elements, and means operated by axial movement of said helical member and cooperating with one of said elements to effect the wrapping of said helical member onto one of said elements.

2. In a clutch, in combination with driving and driven elements, a resilient helical member, and means operated by the resilient movement of said helical member in the direction of its axis and cooperating with one of said elements to effect the wrapping of said helical member onto one of said elements.

3. In a clutch, in combination with driving and driven elements including a drum, a resilient helical member surrounding said drum and adapted to be wrapped onto said drum, means for tensioning said helical member when declutching is effected, and means operated by the resiliency of said helical member for initiating the clutching action of said helical member.

4. In a clutch, in combination with driving and driven elements including a drum, a resilient helical member surrounding said drum and adapted to be wrapped onto said drum, means for tensioning said helical member when declutching is effected, and means actuated by the release of tension of said helical member for initiating the wrapping of said helical member onto said drum.

5. In a clutch, in combination with driving and driven elements including a drum, a resilient helical member surrounding said drum and constituting a wrap-drown clutch, and means cooperating with said helical member and actuated by the axial movement thereof for clutching said member to said drum and initiating the wrap-down action of said member.

6. In a clutch, in combination with driving and driven elements including a drum, a resilient helical member surrounding said drum and constituting a wrap-down clutch, means for placing said helical member under tension when declutching is effected, and means cooperating with one of said first named elements and actuated by the resiliency of said helical member for initiating the wrapping down of said helical member.

7. In a clutch, in combination with driving and driven elements including a drum, a resilient helical member surrounding said drum and constituting a wrap-down clutch, means for compressing said helical member when declutching is effected, and means cooperating with one of said first named elements and actuated by the expansion of said helical member for initiating the wrapping down of said helical member.

8. In a clutch, in combination with driven and driving elements including a drum, a resilient helical member surrounding said drum and adapted to be wrapped thereon, and an actuator cooperating with one of said first named elements to initiate the wrapping down of said helical member, said actuator in turn being operated by said helical member.

9. In a clutch, in combination with driving and driven elements including a drum, a resilient helical member surrounding said drum and adapted to be wrapped thereon, and an actuator cooperating with one of said first named elements for initiating the wrapping down of said helical member, said actuator in turn being actuated by the resiliency of said helical member.

10. In a clutch, in combination with driving and driven elements including a drum, a helical member surrounding said drum and adapted to be wrapped thereon, an actuator operatively connected with one end of said helical member, and means contiguous to said actuator and adapted to cooperate therewith, said actuator and means being relatively movable but adapted upon engagement to initiate a wrapping action between said helical member and drum.

11. In a clutch, in combination with driving and driven elements including a drum, a resilient helical member surrounding said drum and adapted to be wrapped thereon, an actuator operatively connected with one end of said helical member, means contiguous to said actuator and adapted to cooperate therewith, said actuator and means being relatively movable but adapted upon engagement to initiate a wrapping action between said helical member and drum, and means whereby the resiliency of said helical member is employed to engage said actuator with said cooperating means.

12. In a clutch, in combination with driving and driven elements including a drum, a resilient helical member surrounding said drum and adapted to be wrapped thereon, an actuator operatively connected with one end of said helical member, means contiguous to said actuator and adapted to cooperate therewith, said actuator and means being relatively movable but adapted upon engagement to initiate a wrapping action between said helical member and drum, and means for placing said helical member under tension to disengage said actuator and cooperating means and for releasing said helical member to engage said actuator with said cooperating means.

13. In a clutch, in combination with driving and driven elements including a drum, a resilient helical member surrounding said drum and adapted to be wrapped thereon, an actuator operatively connected with one end of said helical member, means contiguous to said actuator and adapted to cooperate therewith, said actuator and means being relatively movable but adapted upon engagement to initiate a wrapping action between said helical member and drum, said helical member engaging said actuator with said cooperating means by the resilient expansion of said helical member, and means for compressing said helical member when said helical member is to be unwrapped.

14. In a clutch, in combination with driving and driven elements including a drum, a helical member adapted to be wrapped onto said drum, and means for initiating the wrapping of said helical member onto said drum, said means including an element operatively connected to the end of said helical member and a pawl-like actuator member for engaging said element and wrapping down said helical member.

15. In a clutch, in combination with driving and driven elements including a drum, a helical member adapted to be wrapped onto said drum, and means for operating said helical member and initiating the wrapping thereof onto said drum, said last named means including relatively rotatable members adapted to be engaged and disengaged by movement of one of said members about an axis separate from that about which they have relative rotation.

16. In a clutch, in combination with driving and driven elements including a drum, a helical member adapted to be wrapped onto said drum, and means for operating said helical member and initiating the wrapping thereof onto said drum, said last named means including a pivotally mounted actuator connected to said helical member and operating between opposed surfaces.

17. In a clutch, in combination with driving and driven elements including a drum, a helical member adapted to be wrapped onto said drum, and means for operating said helical member and initiating the wrapping thereof onto said drum, said means including cooperating members one of which has a cam surface for tensioning and releasing said helical member.

18. In a clutch, in combination with driving and driven elements including a drum, a helical member adapted to be wrapped onto said drum, and means for operating said helical member and initiating the wrapping thereof onto said drum, said means including an element operatively connected to said helical member, an element opposed thereto, said elements being relatively rotatable, and an intermediate element for positively locking said first named elements together.

19. In a clutch, in combination with driving and driven elements including a drum, a resilient helical member adapted to be wrapped onto said drum, an actuator operated by the resiliency of said helical member when released for initiating the wrapping thereof onto said drum, and means for compressing said resilient member and causing relative movement between the ends thereof in a direction to cause unwrapping of said member with respect to said drum, said last named means being also operative to release said helical member.

20. In a clutch, in combination with driving and driven elements including a drum, a resilient helical member adapted to be wrapped onto said drum, means operated by the resiliency of said helical member for initiating the wrapping thereof onto said drum, and means unitarily associated with said helical member for predetermining the time said helical member is wrapped on said drum.

21. In a clutch, in combination with driving and driven elements including a drum, a resilient helical member adapted to be wrapped onto said drum, means operated by the resiliency of said helical member for initiating the wrapping thereof onto said drum, and means engageable with said helical member and fed thereby for predetermining the time said helical member is wrapped on said drum.

22. In a clutch, in combination with driving and driven elements including a drum, a resilient helical member adapted to be wrapped onto said drum, means operated by the resiliency of said helical member for initiating the wrapping thereof onto said drum, a member adapted to engage said helical member and fed thereby for predetermining the time said helical member is wrapped on said drum, and means operated by the movement of said last named member for releasing said member from said helical member and effecting the release of said helical member from said drum.

23. In a clutch, in combination with driving and driven elements including a drum, a resilient helical member adapted to be wrapped onto said drum, means operated by the resiliency of said helical member for initiating the wrapping thereof onto said drum, means for tensioning said helical member, a timing device including a feed member adapted to be moved into feeding relation with said helical member, and means for simultaneously releasing said helical member and moving said feed member into cooperative engagement therewith.

24. In a clutch, in combination with driving and driven elements including a drum, a resilient helical member adapted to be wrapped onto said drum, means operated by the resiliency of said helical member for initiating the wrapping thereof onto said drum, means for tensioning said helical member, a timing device including a feed member adapted to cooperate with said helical member, means for simultaneously releasing said helical member and moving said feed member into cooperative engagement therewith, and means operated by said feed member for moving the same out of engagement with said helical member and re-tensioning said helical member.

25. In a clutch, in combination with driving and driven elements including a drum, a resilient helical member adapted to be wrapped onto said drum, means operated by the resiliency of said helical member for initiating the wrapping thereof onto said drum, means for tensioning said helical member including a trip, a timing device including a feed member adapted to engage said helical member, and means actuated by said trip for engaging said feed member with said helical member.

26. In a clutch, in combination with driving and driven elements including a drum, a resilient helical member adapted to be wrapped onto said drum, means operated by the resiliency of said helical member for initiating the wrapping thereof onto said drum, means adapted to tension said helical member including a trip, a timing device including a feed member adapted to engage said helical member, means actuated by said trip for engaging said feed member with said helical member, and means including a trip for retaining said feed member in cooperative relation with said helical member for a predetermined time.

27. In a clutch, in combination with driving and driven elements including a drum, a resilient helical member adapted to be wrapped onto said drum, means operated by the resiliency of said helical member for initiating the wrapping thereof onto said drum, means for tensioning said helical member including a trip, a timing device including a feed member adapted to engage said helical member, means actuated by said trip for engaging said feed member with said helical member, means including a trip for retaining said feed member in cooperative engagement with said helical member, and means actuated by said feed member for releasing said second-named trip after a predetermined period of operation of said clutch.

28. In a clutch, in combination with driving and driven elements including a drum, a resilient helical member adapted to be wrapped onto said drum, means operated by the resiliency of said helical member for initiating the wrapping thereof onto said drum, means for tensioning said helical member including a trip, a timing device including a feed member adapted to engage said helical member, means actuated by said trip for engaging said feed member with said helical member, means including a trip for retaining said feed member in cooperative engagement with said helical member, means actuated by said feed member for releasing said second-named trip after a predetermined period of operation of said clutch, and means actuated upon the release of said last named trip for restoring said first-named trip to a position for re-tensioning said helical member.

29. In a clutch, in combination with driving and driven elements including a drum, a resilient helical member surrounding said drum and adapted to be wrapped thereonto, means for securing an end of said helical member to one of said elements including an elongated block around which the end of the helical member is passed, and means associated with said block for retaining the end of said member gripped thereon and means for effecting the wrapping of said helical member onto said drum.

30. In a clutch, in combination with driving and driven elements, including a drum, a resilient helical member associated with said drum and adapted to be wrapped onto said drum, and means for initiating the wrapping movement of said helical member onto said drum, said means including members adapted to be engaged by the movement of one end of said helical member longitudinally of its axis and under its own resiliency.

31. In a clutch, in combination with driving and driven elements, including a drum, a resilient helical member associated with said drum and adapted to be wrapped onto said drum, and means for initiating the wrapping movement of said helical member onto said drum, said means including a member moving with the driven element and a member adapted to be engaged therewith for starting the wrapping of said helical member, said last named members being engaged by the axial movement of one end of said helical member under its own resiliency.

32. In a clutch, in combination with driving and driven elements, including a drum, a resilient helical member associated with said drum and adapted to be wrapped onto said drum, means for initiating the wrapping movement of said helical member onto said drum, said means including members adapted to be engaged by the movement of one end of said helical member under its own resiliency, and means for tensioning and releasing said helical member to disengage and engage said members.

33. In a clutch, in combination with driving and driven elements, including a drum, a resilient helical member associated with said drum and adapted to be wrapped onto said drum, means for initiating the wrapping movement of said helical member onto said drum, said means including members adapted to be engaged to start the wrapping action of said helical member, and means for effecting the movement of said helical member in the direction of the axis thereof to engage said members.

34. In a clutch, in combination with driving and driven elements, including a drum, a resilient helical member associated with said drum and adapted to be wrapped onto said drum, and means for initiating the wrapping movement of said helical member onto said drum, said means including relatively movable members for locking one end of said helical member to one of said elements, said locking means being actuated by the resilient action of said helical member in the direction of the axis thereof.

35. In a clutch, in combination with driving and driven elements, including a drum, a resilient helical member associated with said drum and normally having an interior diameter which is greater than the exterior diameter of said drum, and means for wrapping said helical member onto said drum including an element operatively connected to the end of said helical member and a second element locked to said first named element by engagement therewith for positively initiating wrapping down movement of said helical member, one of said elements being pivotally mounted for movement about an axis which is at an angle to the axis of said other element and moved about its axis into locking relation with said first named element by engagement therewith.

ISAAC W. LITCHFIELD.